United States Patent
Mathis

(10) Patent No.: US 10,280,985 B2
(45) Date of Patent: May 7, 2019

(54) FLEXIBLE COUPLINGS FOR POWER TRANSMISSIONS

(71) Applicant: Goodrich Corporation, Charlotte, NC (US)

(72) Inventor: Jeffrey Mathis, Rome, NY (US)

(73) Assignee: Goodrich Corporation, Charlotte, NC (US)

( * ) Notice: Subject to any disclaimer, the term of this patent is extended or adjusted under 35 U.S.C. 154(b) by 149 days.

(21) Appl. No.: 15/139,065

(22) Filed: Apr. 26, 2016

(65) Prior Publication Data

US 2017/0184155 A1    Jun. 29, 2017

Related U.S. Application Data

(60) Provisional application No. 62/387,307, filed on Dec. 23, 2015.

(51) Int. Cl.
| | |
|---|---|
| *F16D 3/58* | (2006.01) |
| *F16D 3/78* | (2006.01) |
| *F16D 3/00* | (2006.01) |

(52) U.S. Cl.
CPC ............... *F16D 3/58* (2013.01); *F16D 3/78* (2013.01); *F16D 3/005* (2013.01)

(58) Field of Classification Search
CPC ...................................... F16D 3/56; F16D 3/58
USPC .............................................. 464/56, 69, 93
See application file for complete search history.

(56) References Cited

U.S. PATENT DOCUMENTS

| | | | | |
|---|---|---|---|---|
| 1,734,988 A | * | 11/1929 | Wilson ....................... | F16D 3/60 |
| | | | | 464/56 |
| 1,778,170 A | * | 10/1930 | Smith ........................ | F16D 3/74 |
| | | | | 464/93 |
| 3,013,412 A | * | 12/1961 | Millman .................... | F16D 3/56 |
| 3,353,373 A | * | 11/1967 | Schumacher ............. | F16D 3/68 |
| | | | | 464/93 |
| 5,158,504 A | | 10/1992 | Stocco | |
| 8,591,345 B2 | | 11/2013 | Stocco et al. | |

FOREIGN PATENT DOCUMENTS

| | | | |
|---|---|---|---|
| FR | 1.022.704 | * | 3/1953 |
| GB | 1155083 | * | 6/1969 |

* cited by examiner

*Primary Examiner* — Greg Binda
(74) *Attorney, Agent, or Firm* — Locke Lord LLP; Scott D. Wofsy; Christopher Cillie

(57) ABSTRACT

A flexible coupling includes an input body, an output body offset from the input body, and a flexible lattice body. The flexible lattice body includes a flex beam member coupling the input body to the output body. The flex beam member has a rounded cross-sectional area with a centrally disposed minimum cross-sectional area to reduce peak stress in the flex beam member while transferring torque and accommodating misalignment between the input body and the output body. The flexible coupling is jointless, simplifying fabrication, and has a free-form geometry, reducing weight.

15 Claims, 5 Drawing Sheets

FLEXIBLE COUPLINGS FOR POWER TRANSMISSIONS

CROSS-REFERENCE TO RELATED APPLICATIONS

This application claims priority to and the benefits of U.S. Provisional Patent Application No. 62/387,307 filed Dec. 23, 2015, which is incorporated by reference herein in its entirety.

BACKGROUND OF THE INVENTION

1. Field of the Invention

The present disclosure relates to power transmissions, and more particularly to flexible couplings for mechanical power transmission systems.

2. Description of Related Art

Transmissions commonly include shafts that transfer torque between one another through a coupling. The coupling typically interconnects the shafts such that torque exerted by one of the interconnected shafts is exerted on the other of the interconnected shafts by the coupling. In some transmissions, the interconnected shafts can be misaligned relative to one another, either axially, angularly, or both axially and angularly relative to one another. The misalignment can exert additional stress on the coupling above that ordinarily associated with the transferred torque. For that reason, some couplings include structural features for managing the stress associated with shaft misalignments. For example, some couplings include planar discs coupled between the shafts that bend in parallel during coupling rotation to accommodate misalignment. Other couplings include axially stacked planar diaphragm discs that flex in series during rotation to accommodate shaft misalignment. The axially stacked planar discs may be axially offset from one another and have necked profiles that deform during rotation to accommodate misalignment between the shafts. The geometry of the planar disc in such couplings is typically selected according to the amount of torque and misalignment expected between interconnected shafts in a given transmission application.

Such conventional methods and systems have generally been considered satisfactory for their intended purpose. However, there is still a need in the art for improved flexible couplings. The present disclosure provides a solution to this need.

SUMMARY OF THE INVENTION

A flexible coupling includes an input body, an output body offset from the input body, and a flexible lattice body. The flexible lattice body includes a flex beam member coupling the input body to the output body. The flex beam member has a rounded cross-sectional area to reduce peak stress in the flex beam member due to misalignment between the input body and the output body while transferring torque.

In certain embodiments, the flex beam member can be radially offset from the input body and the output body. The flex beam member can taper to a point of minimum thickness located between opposed leading and trailing ends of the flex beam member. The flex beam member can define a longitudinal axis. A surface of the flex beam member extending about the longitudinal axis can be rounded. The rounded surface can define a cross-sectional area with a circular or elliptical shape. The rounded surface can extend along the entire longitudinal length of the flex beam member. At either or both ends, the rounded surface of the flex beam member can connect to an interconnect member at a blended surface. The blended surface can have a saddle-shaped profile.

In accordance with certain embodiments, the interconnect member can connect to the input body or the output body. The interconnect member can connect the flex beam member to the spar member. The interconnect member can also connect the flex beam member to a second flex beam member. The interconnect member can have a rounded cross-sectional area. The rounded cross-sectional area can be circular or elliptical in shape. The interconnect member can have a cross-sectional area that is greater than the maximum cross-sectional area of the flex beam member. The interconnect member can have a spherical shape. The interconnect member can connect to the flex beam member at the blended surface. The interconnect member can also connect to the spar member at a blended surface. The blended surface between the spar member and the interconnect member can have a saddle-shaped profile. It is contemplated that a minimum load-carrying area of the interconnect can be larger than a maximum load carrying area of the flex beam member.

It is also contemplated that, in accordance with certain embodiments, the spar member can be connected to the input body or the output body. The spar member can extend radially from the input body or output body. The spar member can extend axially from the input body or output body. The spar member can extend both axially and radially from the input body or the output body. The spar member can taper between a large cross-sectional area adjacent to the input body or the output body, and a small cross-sectional area adjacent to the interconnect member. The spar member can have a rounded surface. A cross-sectional area of the spar member extending about the spar member longitudinal axis can be rounded, such as with a circular or elliptical shape. The rounded cross-sectional area of the spar member can extend along the entire length of the spar member. The rounded surface of the spar member can connect to the interconnect member, the input body, or the output body at a blended surface. The blended surface can have a saddle-shaped profile.

A flexible coupling includes an input body, an output body offset from the input body, and a flexible lattice body. The flexible lattice body includes a flex beam member disposed between the input body and the output body with a rounded cross-sectional area extending about a longitudinal axis defined by the flex beam member. The flexible lattice body also includes a first interconnect member connected to an end of the flex beam member at a blended surface defining a saddle-shaped profile, and a second interconnect member connected to the flex beam member at an end opposite the first interconnect member with a blended surface defining a saddle-shaped profile. A first spar member couples the first interconnect member to the input body at a blended surface defining a saddle-shaped profile. A second spar member couples the second interconnect member to the output body at a blended surface defining a saddle-shaped profile.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
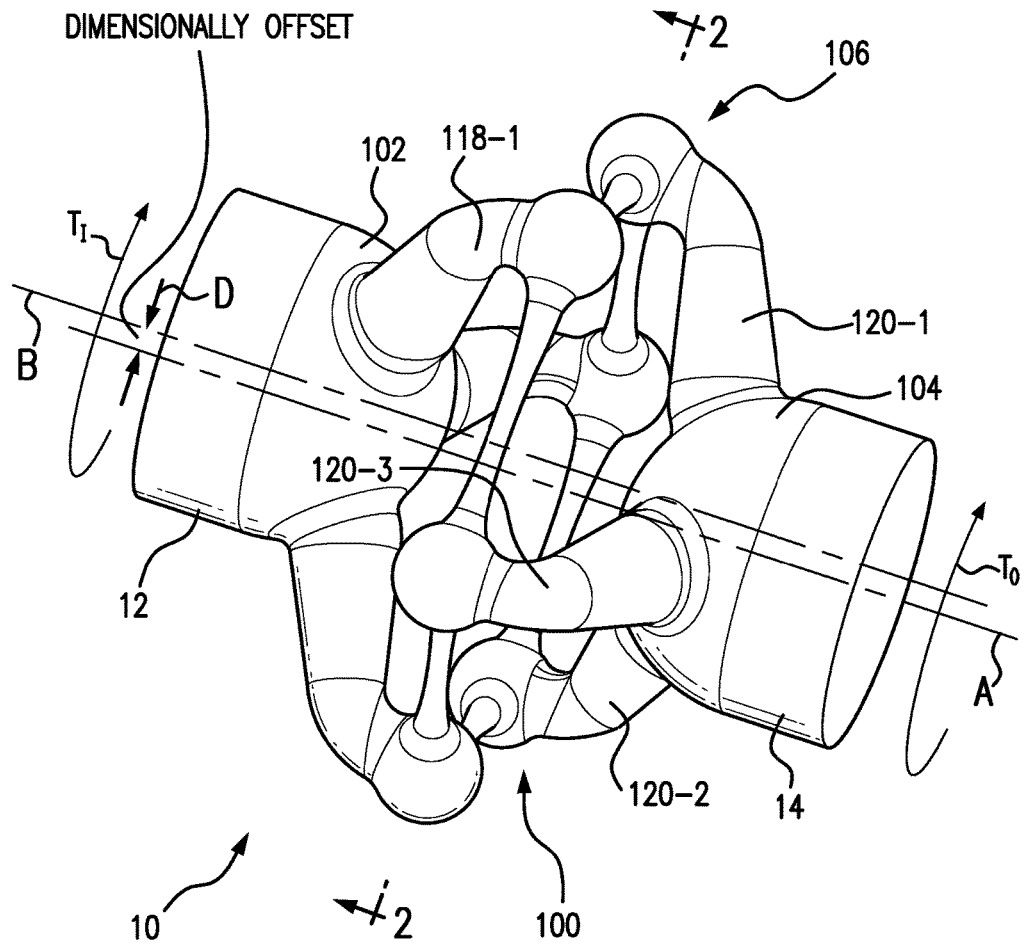
FIG. 1 is a perspective view of an exemplary embodiment of a flexible coupling constructed in accordance with the present disclosure, showing an input body, an output body, and a lattice body connecting the input body with the output body.

Reference will now be made to the drawings wherein like reference numerals identify similar structural features or aspects of the subject disclosure. For purposes of explanation and illustration, and not limitation, a partial view of an exemplary embodiment of a flexible coupling in accordance with the disclosure is shown in FIG. 1, and is designated generally by reference character 100. Other embodiments of flexible couplings in accordance with the disclosure, or aspects thereof, are provided in FIGS. 2-5, as will be described. The systems and methods described herein can be used to transfer torque between rotatable members, such as in aircraft power transmissions systems, however the invention is not limited to aircraft or to power transmissions systems in general.

Referring to FIG. 1, a transmission 10 is shown. Transmission 10 includes a first rotatable member 12, a second rotatable member 14, and a flexible coupling 100. First rotatable member 12 and second rotatable member 14 can include shafts, flanged bodies, splined bodies, or any other power transmission element. Flexible coupling 100 couples first rotatable member 12 with second rotatable member 14 such that an input torque $T_I$ applied to first rotatable member 12 transfers through flexible coupling 100 to second rotatable member 14 as an output torque $T_O$.

Flexible coupling 100 includes an input body 102, an output body 104, and a flexible lattice body 106. Input body 102 is offset from output body 104 and lattice body 106 is disposed between and connects input body 102 and output body 104. Input body 102 defines a first axis B and is rotatable thereabout. Output body 104 defines second axis A and is rotatable thereabout.

Figure 4:
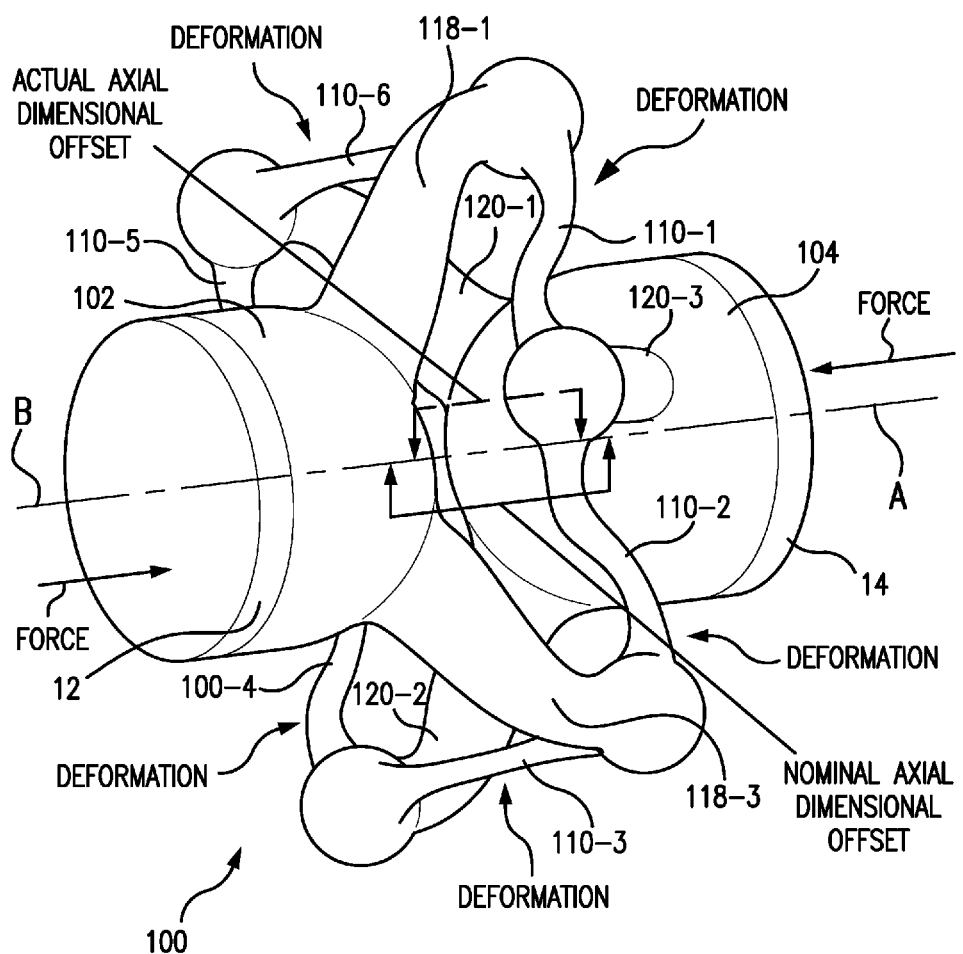
FIG. 4 is a perspective view of the flexible coupling of FIG. 1, showing deformation of the flexible coupling from axial misalignment of the first and second rotatable members.
Figure 5:
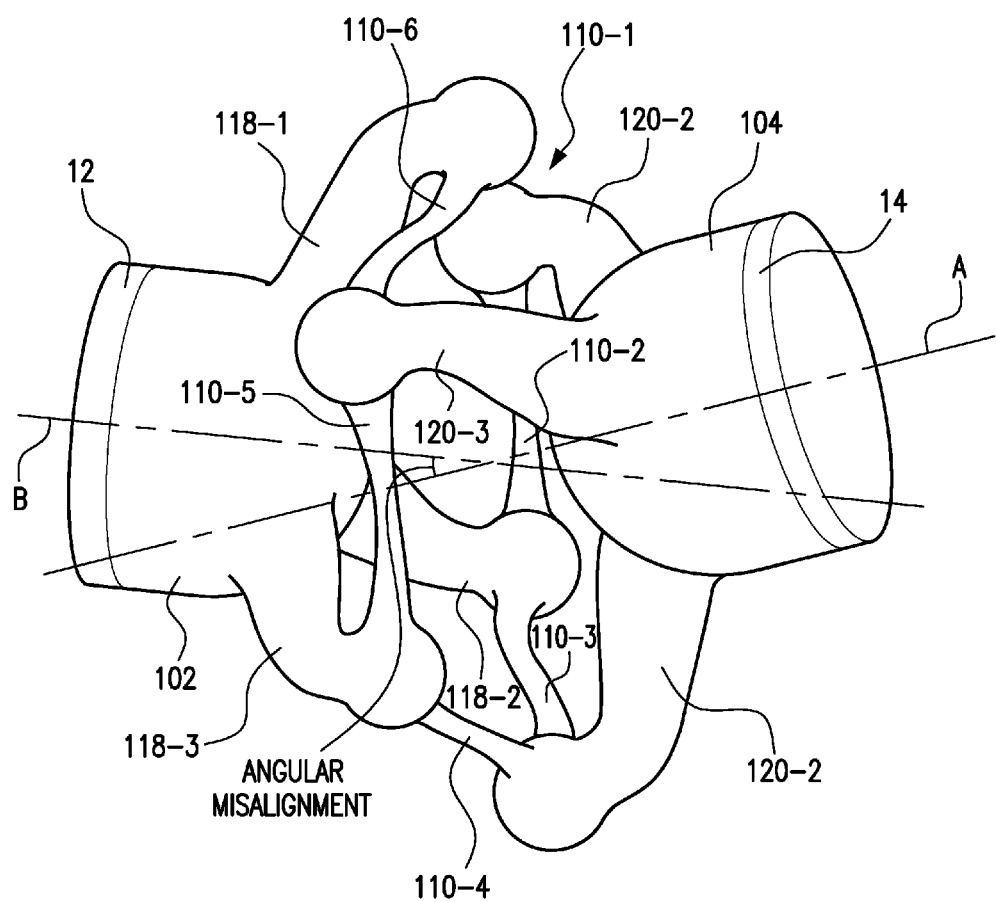
FIG. 5 is a perspective view of the flexible coupling of FIG. 1, showing deformation of the flexible coupling from angular misalignment of the first and second rotatable members.

Flexible lattice body 106 connects input body 102 with output body 104 to allow for torque transfer between input body 102 and output body 104 while input body 102 is angularly or dimensionally offset from second axis A and allowing variation in an axial distance between input body 102 and output body 104. Exemplary dimensional offsets between input body 102 and output body 104 are shown in FIG. 1 and FIG. 4, where first axis A is offset by dimensional offset D. Variation in axial offset between input body 102 and output body 104 is shown in FIG. 4, a nominal distance between input body 102 and output body 104 and an actual distance between input body 102 and output body 104 indicated with labels on the figure. An exemplary angular misalignment between input body 102 and output body 104 is shown in FIG. 5, where axis A and axis B are separated by an angle. As will be appreciated by those skilled in the art in view of the present disclosure, flexible coupling 100 is configured to transfer torque or power between input body 102 and output body 104 while accommodating misalignment.

Input body 102, output body 104, and flexible lattice body 106 are integral with one another. In the illustrated exemplary embodiment, flexible coupling 100 is a single piece flexure formed using additive manufacturing technique, and may include one or more metals or any other suitable material. Examples of additive manufacturing technique include laser sintering and powder bed fusion by way of non-limiting example. Use of additive manufacturing techniques allow flexible coupling 100 to have a free form shape where selected elements and element portions can be made more rigid or more flexible based upon the stress fields associated with the misalignment and torque transfer in a given application. Although discussed herein as having a certain number of spar members, interconnect members, and flex beam members, it is to be understood and appreciated that flexible coupling 100 can have fewer or more spar members, interconnect members, and/or flex beam members, as suitable for a given application.

Figure 2:
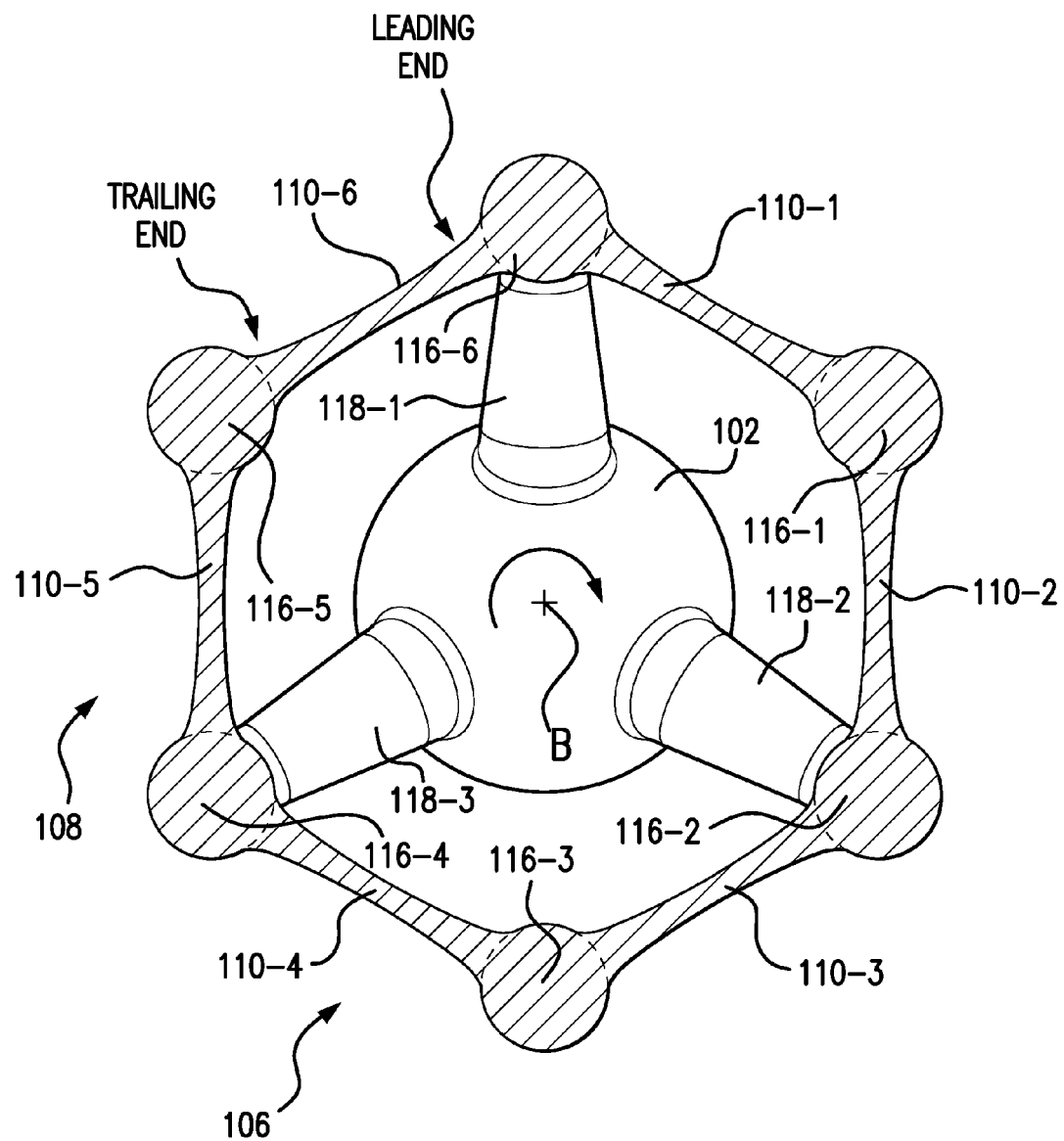
FIG. 2 is axial cross-sectional view of the flexible coupling of FIG. 1, showing the polygonal arrangement of the flex beam members, interconnect members, and spar members.

With reference to FIG. 2, flexible lattice body 106 includes a plurality of spar members, i.e. spar members 120-1 (shown in FIG. 1), 120-2 (shown in FIG. 1), 120-3 (shown in FIG. 1), 118-1, 118-2, and 118-3 and a deformable polygonal ring 108. Polygonal ring 108 includes a plurality of interconnect members, i.e. interconnect members 116-1, 116-2, 116-3, 116-4, 116-5, and 116-6, connected to both the spar members and a plurality of flex beam members, i.e. flex beam members 110-1, 110-2, 110-3, 110-4, 110-5, and 110-6, connected between circumferentially adjacent interconnect members. Spar member 118-1 can taper between a large cross-sectional area adjacent to input body 102 and a small cross-sectional area adjacent to interconnect member 116-6. Spar member 118-2 can taper between a large cross-sectional area adjacent to input body 102 and a small cross-sectional area adjacent to interconnect member 116-2. Spar member 118-3 can taper between a large cross-sectional area adjacent to input body 102 and a small cross-sectional area adjacent to interconnect member 116-4. Spar member 120-1 can taper between a large cross-sectional area adjacent to output body 104 and a small cross-sectional area adjacent to interconnect member 116-1. Spar member 120-2 can taper between a large cross-sectional area adjacent to output body 104 and a small cross-sectional area adjacent to interconnect member 116-3. Spar member 120-3 can taper between a large cross-sectional area adjacent to output body 104 and a small cross-sectional area adjacent to interconnect member 116-5.

A first flex beam member 110-1 is connected at a leading end to a trailing end of a second flex beam member 110-2. A second flex beam member 110-2 is connected at a leading end to a trailing end of a third flex beam member 110-3. A third flex beam member 110-3 is connected at a leading end to a trailing end of a fourth flex beam member 110-4. A fourth flex beam member 110-4 is connected at a leading end to a trailing end of fifth flex beam member 110-5. A fifth flex beam member 110-5 is connected at a leading end to a trailing end of sixth flex beam member 110-6. A sixth flex beam member 110-6 is connected at a leading end to a trailing end of first flex beam member 110-1.

Interconnect members, i.e. interconnect members 116-1, 116-2, 116-3, 116-4, 116-5, and 116-6, are connected in series with one another within polygonal ring 108 between adjacent flex members 110. With respect to the illustrated exemplary embodiment, an interconnect member 116-1 connects flex beam member 110-1 with flex beam member 110-2. An interconnect member 116-2 connects flex beam member 110-2 with flex beam member 110-3. An interconnect member 116-3 connects flex beam member 110-3 with flex beam member 110-4. An interconnect member 116-4 connects flex beam member 110-4 with fifth flex beam member 110-5. An interconnect member 116-5 connects flex beam member 110-5 with flex beam member 110-6. An interconnect member 116-6 connects flex beam member 110-6 with flex beam member 110-1. Interconnect member 116-1 can have a spherical shape. Interconnect member 116-2 can have a spherical shape. Interconnect member 116-3 can have a spherical shape. Interconnect member 116-4 can have a spherical shape. Interconnect member 116-5 can have a spherical shape. Interconnect member 116-6 can have a spherical shape.

Interconnect members, i.e. interconnect members 116-1, 116-2, 116-3, 116-4, 116-5, and 116-6, connect to input body 102 or output body 104 (shown in FIG. 1) in a circumferentially alternating arrangement through spar members 118/120. In this respect spar member 118-1 connects interconnect member 116-6 to input body 102, spar member 118-2 connects interconnect member 116-2 to input body 102, and spar member 118-3 connects interconnect member 116-4 to input body 102. Spar member 120-1 (shown in FIG. 1) connects interconnect member 116-1 to output body 104 (shown in FIG. 1), spar member 120-2 (shown in FIG. 1) connects interconnect member 116-3 to output body 104 (shown in FIG. 1), and spar member 120-3 (shown in FIG. 1) connects interconnect member 116-5 to output body 104 (shown in FIG. 1). In the illustrated exemplary embodiment, a minimum load-carrying area of each interconnect is larger than a maximum load carrying area of the flex beam member. In this respect each flex beam member has a maximum cross-sectional area that is smaller than a minimum cross-sectional area of each of the interconnect member. Therefore stress in each of the flex beam members is greater than stress within each of the interconnect members for a given loading.

Figure 3:
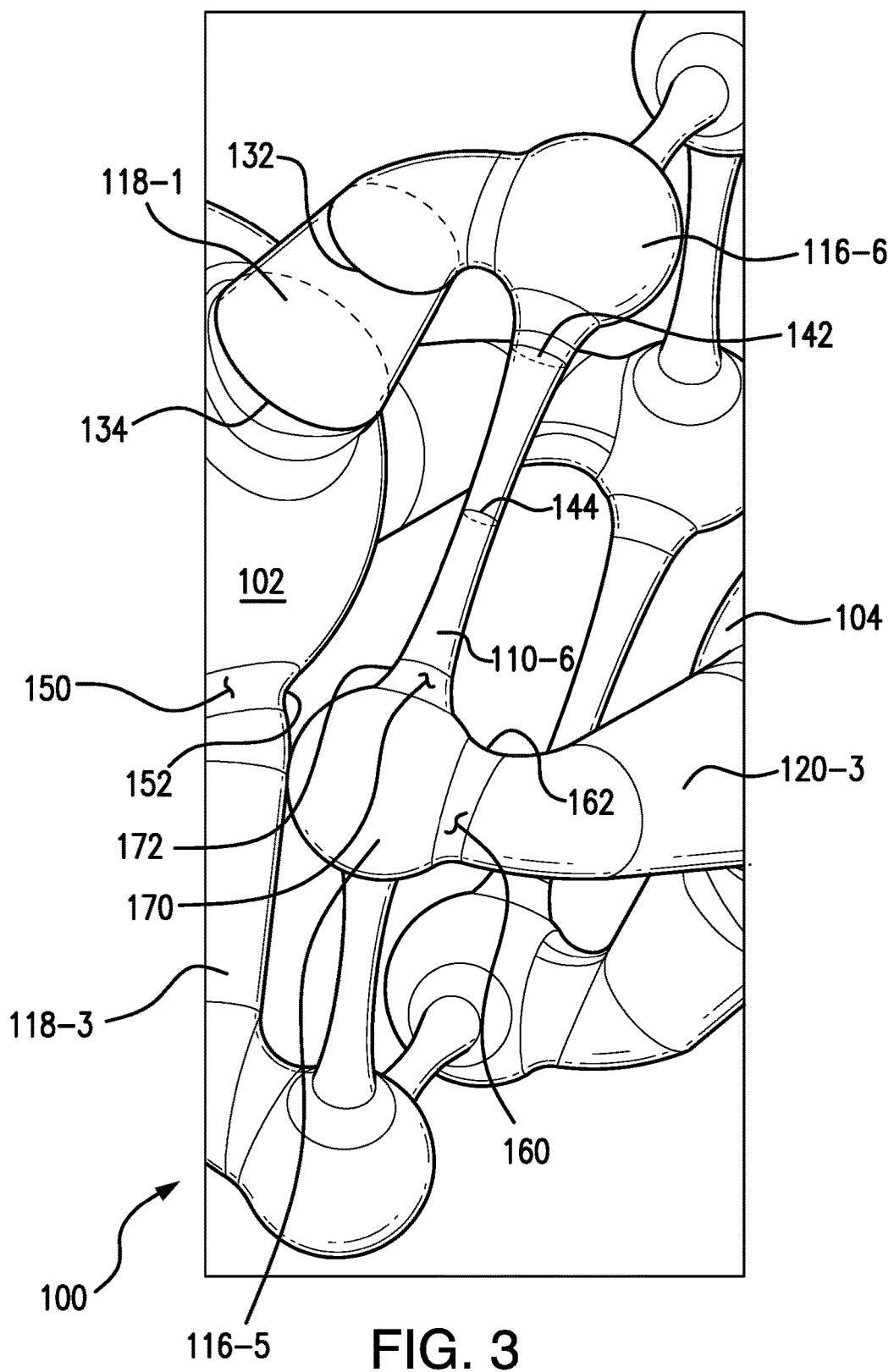
FIG. 3 is a perspective view of a portion of the lattice body of FIG. 1, showing rounded surfaces with saddle-shaped profiles where the flex beam members, interconnect members, and spar members join one another.

With reference to FIG. 3, a portion of flexible coupling 100 is shown. Each spar member, e.g., spar member 118-1 and spar member 120-3, extend both radially and axially from input body 102 or output body 104 to interconnect members disposed between input body 102 and output body 104, e.g., interconnect member 116-5 and interconnect member 116-6, thereby coupling the interconnect members to input body 102 and output body 104. As indicated on exemplary spar member 118-1, each of the spar members has a rounded cross-sectional area that extends substantially along the entire length of a respective spar member. The rounded cross-sectional area extends from a large cross-sectional area adjacent input body 102 or output body 104, e.g., large cross-sectional area 134 on spar member 118-1, to a relatively small cross-sectional area adjacent the interconnect members, e.g. small cross-sectional area 132 on spar member 118-1. The small cross-sectional area defines a minimum cross-sectional area along the spar member that is larger than the maximum cross-sectional area of the flex beam member, e.g. maximum cross-sectional area 142 indicated on flex beam member 110-6. The interconnects are similarly constructed such that each interconnect has a minimum cross-sectional area that is also larger than the maximum cross-sectional area of the flex member. This places deformation due to misalignment in a flex beam portion including the minimum cross-sectional area and extending longitudinally along a length of the flex beam member in either direction from the location of the minimum cross-sectional area.

As indicated on exemplary spar member 118-3, each spar member 118/120 connects to input body 102 or output body 104 at a blended surface 150. The blended surface 150 has a saddle-shaped profile 152, reducing the stress concentration factor associated with the intersection of the respective spar member and input body 102 or output body 104. As also indicated on exemplary spar member 120-3, each spar member 118/120 connects to a respective interconnect at a blended surface 160. The blended surface 160 has a saddle-shaped profile 162, also reducing the stress concentration factor associated with the intersection of the spar member with the respective interconnect. It is to be appreciated and understood that each spar member 118/120 is similarly constructed in this respect.

As indicated on exemplary flex beam member 110-6, each flex beam member defines a rounded, e.g., circular or elliptical, cross-sectional area 144. Rounded cross-sectional area 144 extends along substantially the entire length of flex beam member 110 and connects to a respective interconnect at a blended surface 170 with a saddle-shaped profile 172. Blended surface 170 and saddle-shaped profile 172 shift the peak stress within the flex beam member to a location outside the portion of the flex beam member bounded by blended surface 170.

Each flex beam member also tapers along its longitudinal length to a point of minimum thickness that is generally disposed at a midpoint between the leading end and trailing end of the respective flex beam, e.g., midpoint 144 of flex beam member 110-6. The cross-sectional area is defined which increases to larger cross-sectional areas (e.g., thickness 142) adjacent the interconnect members connected at the opposed leading and trailing ends of the flex beam member. The minimum cross-sectional area defined at the midpoint of the flex beam member distributes stress within the flex beam member between two peak stress locations. The first peak stress location being disposed between the point of minimum thickness and the leading end of the flex beam member, and the second peak stress location being disposed between the point of minimum thickness and the trailing end of the flex beam member. It is to be appreciated and understood that each of the flex beam members is similarly constructed in this respect.

With reference to FIGS. 4 and 5, flexible coupling 100 is shown transferring torque while misaligned. With respect to FIG. 4, flexible coupling 100 is shown transferring mechanical rotation with first rotatable member 12 misaligned with respect second rotatable member 14 such that opposed forces displace either or both of input body 102 and output body 104 toward one another, causing the indicated axial dimensional offset. Responsive to the axial misalignment, one or more of the flex beam members, e.g., flex beam member 110-1, 110-2, 110-3, 110-4, 110-5, and/or 110-6, each deform uniformly while the spar members, e.g., spar members 118-1, 118-2, 118-3, 120-1, 120-2, and 120-3, each retain the geometry shown in FIG. 1. As would be appreciated by those of skill in the art in view of the present disclosure, axially opposed forces applied to input body 102 and output body 104 can also displace either of both away from one another, increasing the actual axial dimensional offset relative to the nominal axial dimensional offset between the bodies, and resulting in deformation in the flex beam members while the spar members retain the spar member geometry shown in FIG. 1.

With respect to FIG. 5, flexible coupling 100 is shown transferring mechanical rotation with first rotatable member 12 angularly misaligned with respect second rotatable member 14. In this respect axis A of output body 104 is oriented toward axis B of input body 102 at an angle, illustrated as an oblique angle. Responsive to the angular misalignment, the flex beam members, e.g., flex beam members 110-1, 110-2, 110-3, 110-4, 110-5, and/or 110-6, each deform according to rotational position while the spar members 118, e.g., spar members 118-1, 118-2, 118-3, 120-1, 120-2, and 120-3, each retain the geometry shown in FIG. 1.

In embodiments described herein, the integral (or unitary) construction of flexible coupling 100 allows for reduction or elimination of joints typically found in flexible coupling assemblies, such as weld joints in diaphragm couplings and fasteners in disk couplings. Reduction or elimination of joints can in turn reduce the need to inspect flexible coupling 100 for fretting that can occur in bolted joints. Moreover, the integral (or unitary) construction can reduce manufacturing time because there is no need to fabricate individual coupling components and/or assemble individual components into a flexible coupling assembly.

In certain embodiments, a free form approach to the arrangement of flexible coupling 100 allows material to be added or removed to increase flexibility while maintaining relatively low stress for a contemplated application. This allows flexible coupling 100 to be lightweight and/or less expensive relative to other coupling arrangements for a given torque load and expected misalignment. It also allows for the orientation of the flex beams and spars, and the location of the interconnects to vary, facilitating manufacturing of the coupling using an additive manufacturing technique.

The methods and systems of the present disclosure, as described above and shown in the drawings, provide for flexible couplings with superior properties including improved tolerance for interconnect rotatable member misalignment. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A flexible coupling, comprising:
   an input body;
   an output body offset from the input body;
   a flexible lattice body coupling the input body to the output body, wherein the flexible lattice body includes a flex beam member with a rounded cross-sectional area; and
   an interconnect member connected to the flex beam member with a spherical shape, wherein a minimum load-carrying area of the interconnect is larger than a maximum load carrying area of the flex beam member.

2. The flexible coupling as recited in claim 1, wherein the rounded cross-sectional area has a circular shape or an elliptical shape.

3. The flexible coupling as recited in claim 1, wherein the rounded cross-sectional area of the flex beam member extends along the entire longitudinal length of the flex beam member.

4. The flexible coupling as recited in claim 1, wherein the flex beam member tapers between opposed leading and trailing ends to a point of minimum thickness therebetween.

5. The flexible coupling as recited in claim 1, further including an interconnect member connected to the flex beam member with a spherical shape.

6. The flexible coupling as recited in claim 5, wherein the interconnect member connects to the flex beam member at a blended surface having a saddle-shaped profile spanning the members.

7. The flexible coupling as recited in claim 5, further including a spar member connected to the interconnect member and coupling the interconnect member to the input body or to the output body.

8. The flexible coupling as recited in claim 1, further including a spar member connected to the input body or the output body, the spar member further connected to the flex beam member.

9. The flexible coupling as recited in claim 8, wherein the spar body extends both radially and axially from the input body or output body to the interconnect member.

10. The flexible coupling as recited in claim 8, wherein the spar member defines a rounded cross-sectional area along substantially the entire length of the spar member.

11. The flexible coupling as recited in claim 1, wherein the flexible coupling is a jointless body of unitary construction.

12. A flexible coupling, comprising:
    an input body;
    an output body offset from the input body;
    a flexible lattice body coupling the input body to the output body, wherein the flexible lattice body includes a flex beam member with a rounded cross-sectional area; and
    a spar member connected to the input body or the output body, the spar member further connected to the flex beam member,
    wherein the spar member tapers between a relatively large cross-sectional area adjacent the input body or output body and a relatively small cross-sectional area adjacent to the flex beam member.

13. A flexible coupling, comprising:
    an input body;
    an output body offset from the input body;
    a flexible lattice body coupling the input body to the output body, wherein the flexible lattice body includes a flex beam member with a rounded cross-sectional area; and
    a spar member connected to the input body or the output body, the spar member further connected to the flex beam member,
    wherein the spar member connects to the input body or the output body at a blended surface.

14. The flexible coupling as recited in claim 13, wherein the blended surface has a saddle-shaped profile spanning the spar member and the input body or the output body.

15. A flexible coupling, comprising:
    an input body;
    an output body offset from the input body; and
    a flexible lattice body including:
        a flex beam member disposed between the input body and the output body, wherein the flex beam includes a rounded cross-sectional area extending about a longitudinal axis defined by the flex beam member;

a first interconnect member connected to an end of the flex member, wherein the flex beam member connects to the interconnect member at a blended surface, wherein the blended surface has a saddle-shaped profile;

a first spar member coupling the first interconnect member to the input body, wherein the first spar member extends in both a radial and an axial direction relative to a rotation axis defined by the flexible coupling, wherein the first spar member connects to the first interconnect member at a blended profile, wherein the blended profile has a saddle-shaped profile;

a second interconnect member connected to the flex beam member at an end opposite the first interconnect member, wherein the flex beam member connects to the interconnect member at a blended surface, wherein the blended surface has a saddle-shaped profile; and a second spar member coupling the second interconnect member to the output body, wherein the second spar member extends in both a radial and an axial direction relative to the rotation axis defined by the flexible coupling, wherein the second spar member connects to the second interconnect member at a blended surface, wherein the blended surface has a saddle-shaped profile.

\* \* \* \* \*